B. F. BROWN.
LABELING MACHINE.
APPLICATION FILED DEC. 15, 1905.

1,053,781.

Patented Feb. 18, 1913
8 SHEETS—SHEET 1.

Fig. 1.

WITNESSES:

INVENTOR
Benjamin F. Brown
BY
ATTORNEYS.

B. F. BROWN.
LABELING MACHINE.
APPLICATION FILED DEC. 15, 1905.

1,053,781.

Patented Feb. 18, 1913.
8 SHEETS—SHEET 3.

Fig. 3.

WITNESSES:
Thomas J. Drummond
Edward F. Allen

INVENTOR.
Benjamin F. Brown
BY
Crosby Gregory
ATTORNEYS.

B. F. BROWN.
LABELING MACHINE.
APPLICATION FILED DEC. 15, 1905.

1,053,781.

Patented Feb. 18, 1913.
8 SHEETS—SHEET 4.

Fig. 4.

WITNESSES:
Thomas J. Drummond
Edward F. Allen

INVENTOR
Benjamin F. Brown,
BY
Charby Gregory
ATTORNEYS.

B. F. BROWN.
LABELING MACHINE.
APPLICATION FILED DEC. 15, 1905.

1,053,781.

Patented Feb. 18, 1913.
8 SHEETS—SHEET 5.

Fig.5.

WITNESSES
Thomas J. Drummond
Edward H. Allen.

INVENTOR
Benjamin F. Brown,
BY Crosby Gregory
ATTORNEYS.

B. F. BROWN.
LABELING MACHINE.
APPLICATION FILED DEC. 15, 1905.

1,053,781.

Patented Feb. 18, 1913.
8 SHEETS—SHEET 7.

Witnesses:
Thomas J. Drummond
Edward F. Allen

Inventor.
Benjamin F. Brown,
by Crosby Gregory,
Attys.

B. F. BROWN.
LABELING MACHINE.
APPLICATION FILED DEC. 15, 1905.

1,053,781.

Patented Feb. 18, 1913.
8 SHEETS—SHEET 8.

Witnesses.
Thomas J. Drummond
Edward F. Allen

Inventor.
Benjamin F. Brown
by Leonby Gregory
Attys.

UNITED STATES PATENT OFFICE.

BENJAMIN F. BROWN, OF BOSTON, MASSACHUSETTS, ASSIGNOR TO THE BROWN BAG FILLING MACHINE COMPANY, OF FITCHBURG, MASSACHUSETTS, A CORPORATION OF MASSACHUSETTS.

LABELING-MACHINE.

1,053,781. Specification of Letters Patent. Patented Feb. 18, 1913.

Application filed December 15, 1905. Serial No. 291,823.

*To all whom it may concern:*

Be it known that I, BENJAMIN F. BROWN, a citizen of the United States, and a resident of Boston, county of Suffolk, and State of Massachusetts, have invented an Improvement in Labeling-Machines, of which the following description, in connection with the accompanying drawings, is a specification, like letters on the drawings representing like parts.

This invention has for its object to provide a novel labeling machine which is adapted to apply labels to envelops, folding boxes, and similar articles.

The machine has been especially designed to take the individual envelops or boxes in a folded or flat condition and apply the label thereto when in such condition.

The machine comprises a label-gumming mechanism, means to feed the gummed labels into position to be applied to the envelops or boxes, means to feed the envelops or boxes into proper juxtaposition to the gummed label, and a presser for pressing the label and envelop together thereby to set the label.

A machine embodying my invention will be first described and then the novel features thereof will be pointed out in the claims.

For convenience, I will refer to the article to which the label is applied as an "envelop," though it will be apparent that the machine is adapted to apply labels to other articles than envelops.

3 designates the frame of the machine which may be of any suitable shape and construction adapted to support the operative parts. This frame supports a driving shaft 4 driven by a suitable driving pulley 5 and carrying a plurality of cams, pulleys and gears by which the various motions are imparted to the operative parts of the machine.

As stated above, the complete machine comprises a label-gumming mechanism, a label-feeding mechanism, an envelop-feeding mechanism to bring the envelop into juxtaposition to the label, and a label-setting mechanism.

*Label-gumming mechanism.*—The means for gumming the labels is similar in many respects to the gumming mechanism of an envelop machine, in that it comprises an elevator on which the pile of labels to be gummed is supported; a picker, which after being properly gummed, is brought against the top label thereby to apply gum thereto, and is then retracted to withdraw from the pile the gummed label, and a stripper to strip the gummed label from the picker.

In the drawings, 6 designates a pile of ungummed labels, which are supported by a suitable elevator 7, and 8 designates a picker. This picker is carried by a reciprocating plunger 9 movable in a guide 10 carried by the frame and obtaining its up-and-down movement from a lever 11 which is connected by a link 12 to a lever 13 which is operated by a suitable cam 130 on the driving shaft 4.

The picker is provided with a plurality of ribs or flanges 14 which play up and down through slots 15 in a stripper 16. Gum is applied to the edges of the ribs or flanges 14 just before the picker descends by a suitable gumming roll 17 which reciprocates back and forth on ways 18, it being reciprocated by means of a suitable lever 19 which is operated from a cam 20. The gum is supplied to the gumming roll from a gumpot 21 of any suitable construction, such as is commonly used in an envelop machine, and preferably the mechanism for reciprocating the roll is such as to move it across the face of the picker once only each time the picker is elevated.

22 designates the mechanism for gradually elevating the support for the pile of labels as the labels are used therefrom. This elevator mechanism may be of any suitable construction and is common to envelop machines. I have not deemed it necessary, therefore, to specifically describe the same.

Figure 6:
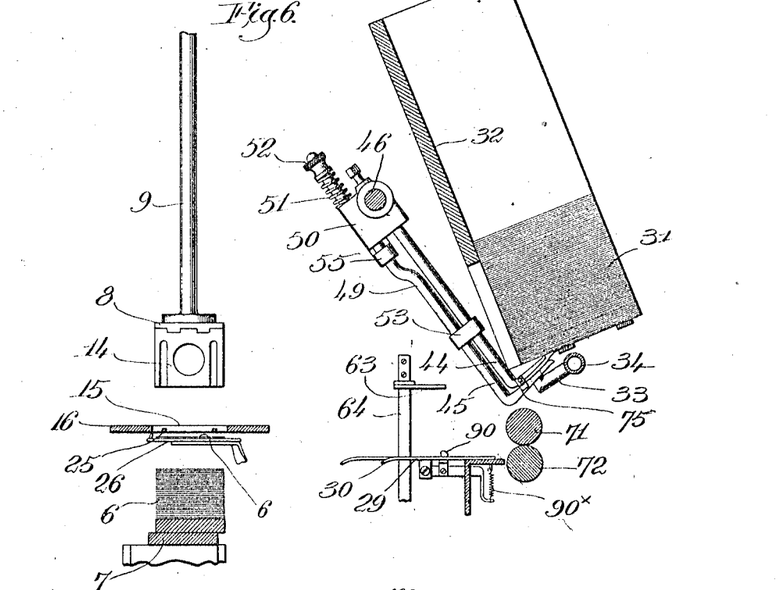
Fig. 6 is a detail view showing the position of the operative parts when the gripping jaws are about to grasp an envelop.

The cam mechanism for the picker and gumming roll is so timed that when the picker is in its elevated position, as shown in Fig. 6, the gumming roll is moved across the under face of the picker, thereby coating the edges of the ribs 14 with gum or other adhesive material. The picker then descends through the slots 15 in the stripper and is brought into engagement with the top-most label. As the picker is elevated, the topmost label adheres thereto and is lifted up thereby, said label being stripped from the picker as the blades are withdrawn from the slots 15. I have herein shown the outside slots 15 as having cross bars 25, so as to prevent the edges of the labels from being drawn up through the slots by the picker.

*Label-feeding mechanism.*—The label-feeding mechanism comprises a carrier which is moved into position beneath the label just prior to the time that the latter is stripped from the picker, and which operates to receive the label as it is stripped and carry it into the position into which it is applied to the envelop. In the present embodiment of my invention this carrier is designated by 26, and is mounted on a swinging arm 27 suitably pivoted at 280 and operated by means of a cam 290 fast on the shaft 4. This carrier is provided with open slots 27ˣ and with positioning projections 28 by which the label is properly positioned.

Figure 9:
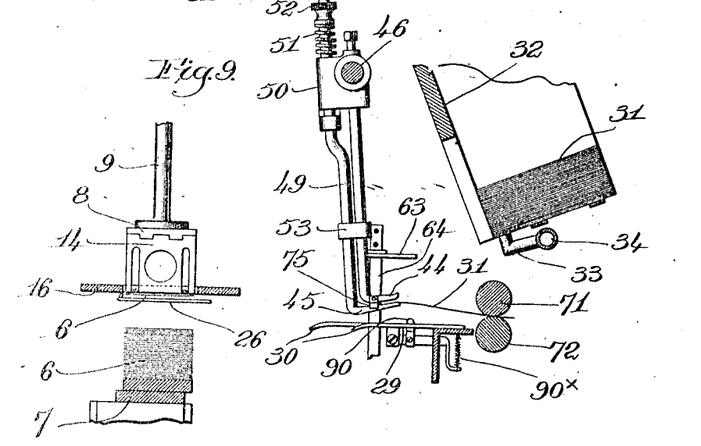
Fig. 9 shows the envelop with the label attached being fed into the presser-rolls.

The cam 130 for operating the picker is so shaped that the picker is brought to a rest during its upward movement, and just before the label adhering thereto is brought against the stripper, as shown in Fig. 9, and the cam 290 is so shaped and timed that when the picker 8 is in the position and just prior to the time that the label is stripped, said carrier is moved forward into the position shown in said Fig. 9 directly under the label which is still supported by the picker. While the carrier is in this position, the cam for operating the picker completes the upward movement of the latter, whereby the label is stripped from the picker, said label dropping onto the carrier. The carrier then moves to the right into the position shown in Fig. 5, carrying the gummed label with it.

29 designates a table onto which the gummed label is transferred from the carrier, this transfer being accomplished in this embodiment of my invention by the movement of the carrier itself. For this purpose the table is provided with fingers 30 which enter slots 27ˣ of the carrier during the latter part of the movement of the latter, said fingers entering beneath the gummed label so that the label is transferred onto the fingers of the table. When the carrier is retracted to receive a new label, the already-gummed label remains on the table, in which position it is applied to the envelop.

90 designates stop-fingers which are pivoted to the table 29 and which normally occupy a position above the level of the table, being held up by a spring 90ˣ.

*Envelop-feeding mechanism.*—The envelops to be labeled are designated by 31 and are supported in a suitable holder 32. These envelops are fed one at a time into a position directly over the gummed label as it is sustained by the table 29, and when in this position the envelop is acted upon by a presser mechanism which sticks the envelop to the gummed label, it being understood of course that the label is already on the table, gummed side uppermost.

For separating the bottom envelop from the stack of envelops 31 in order that it may be fed onto the table 29, I employ a suction device such as is common in envelop machines and other machines where individual sheets of paper are fed from a stack or pile. In the present embodiment of my invention, this suction device comprises suction nozzles 33 connected to a pipe or tube 34, which pipe or tube is mounted in bearings so as to turn about its axis, and which is connected by means of a flexible connection 35 to a pump or exhaust mechanism 36. The piston-rod 37 of the pump is connected to a lever 38 which is operated by a suitable cam 39 on the shaft 4. The tube or pipe 34 has fast thereto an arm 40 which is connected by a link 41 to a lever 42 which is actuated by a suitable cam 43 on the shaft 4. The cams 43 and 39 are so timed that when the suction nozzles are swung upwardly against the edge of the bottom envelop, the pump applies suction to said nozzle, and as the nozzles are swung downwardly, they carry with them the edge of the bottom envelop, thus separating it from the other envelops. At this time a pair of envelop-gripping jaws are advanced to grip the edge of the separated envelop, and said jaws are then moved so as to withdraw the envelop from the hopper and carry it directly over the gummed label which is sustained on the table 29. These gripping-jaws are designated by 44 and 45, and are illustrated as being sustained by a rock-shaft 46, which is operated from a cam 47 by a suitable lever and link mechanism 48. The jaw 44 is rigid with a rock-shaft 46, but the jaw 45 is mounted to be moved relative to the other jaw thereby to permit the jaws to be opened and closed. As herein shown, the stem 49 on the movable jaw is slidably mounted in a head 50, carried by the rock-shaft, and is acted on by a spring 51 which tends normally to close the jaws together. Said spring is illustrated as surrounding the stem 49 and bearing at one end against the head 50, and at the other end against an adjustable nut 52 carried by the stem.

The stem 49 of the movable jaw is guided in its movement by a suitable guide 53 carried by the stem of a fixed jaw.

Suitable means are provided for separating the jaws as the latter are swung into position to grasp the separated envelop. For this purpose, I have herein shown a cam 54 which is adapted to be forced between the head 50 and a collar 55 on the stem 49 at the proper time to separate the gripping-jaws. This cam 54 is herein shown as supported on a collar 56 slidably mounted on the rock-shaft 46 and actuated at the proper time by a cam 57 on the main shaft 4. The end of the shaft 46 is shown as being bored out to receive the end of a thrust-member 58, and said thrust-member is rigid with the sliding collar 56 so that movement of the thrust-member longitudinally of the shaft 46 gives proper movement to the cam 54. The thrust-member is actuated by a lever 59 which is connected by a link 60 with a lever 61 actuated by the cam 57.

Figure 1:
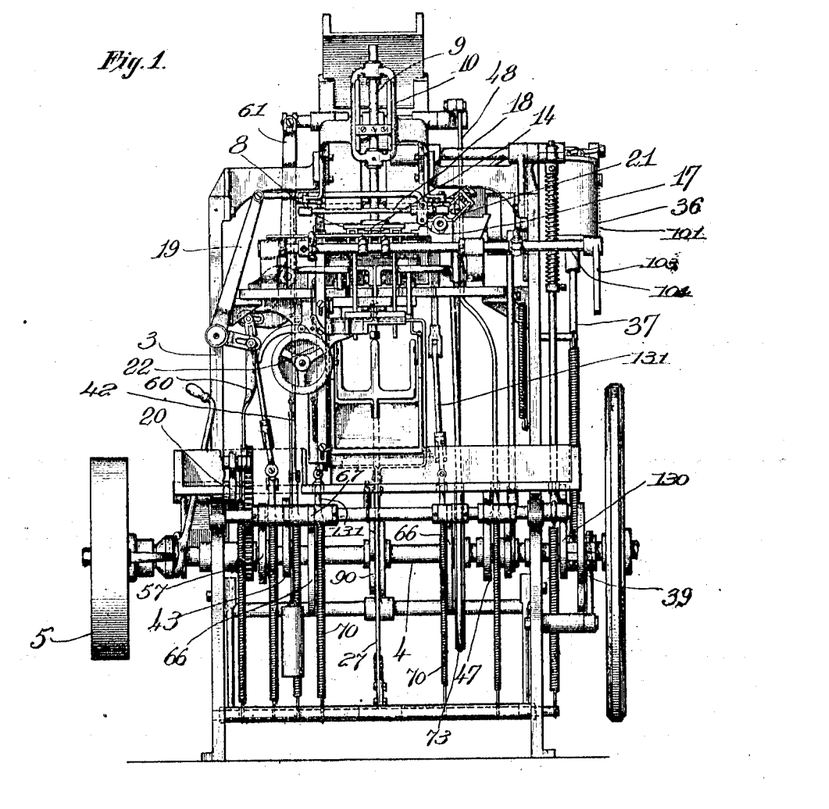
Figure 1 is a front view of a machine embodying my invention.
Figure 2:
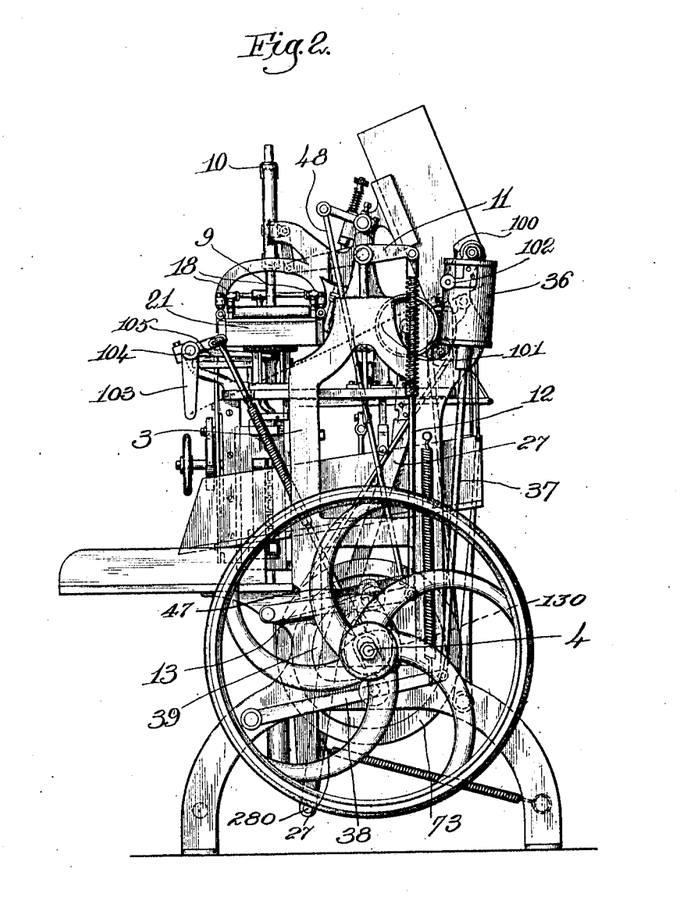
Fig. 2 is a side view thereof.
Figure 3:
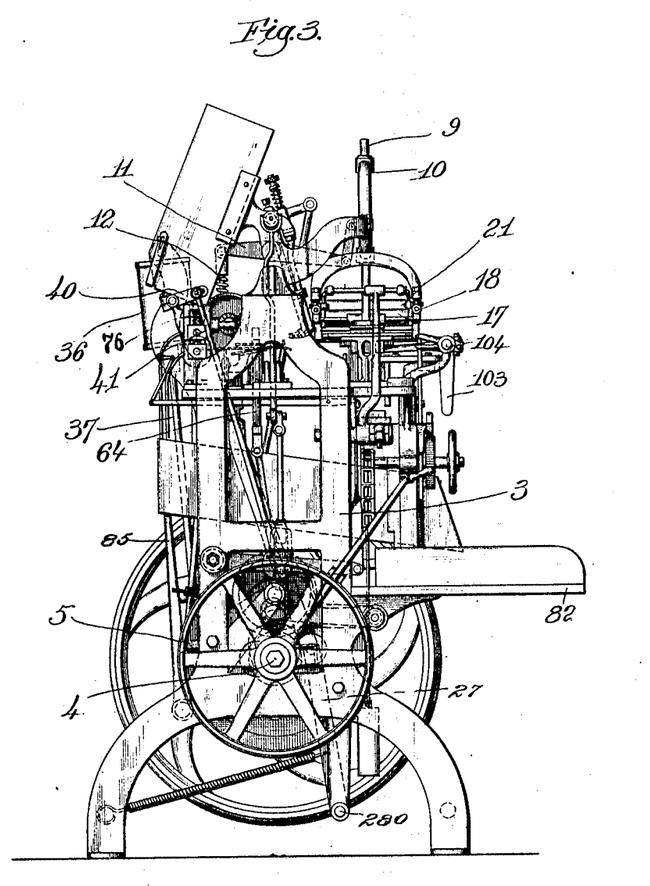
Fig. 3 is a side view looking in the opposite direction from Fig. 1.
Figure 4:
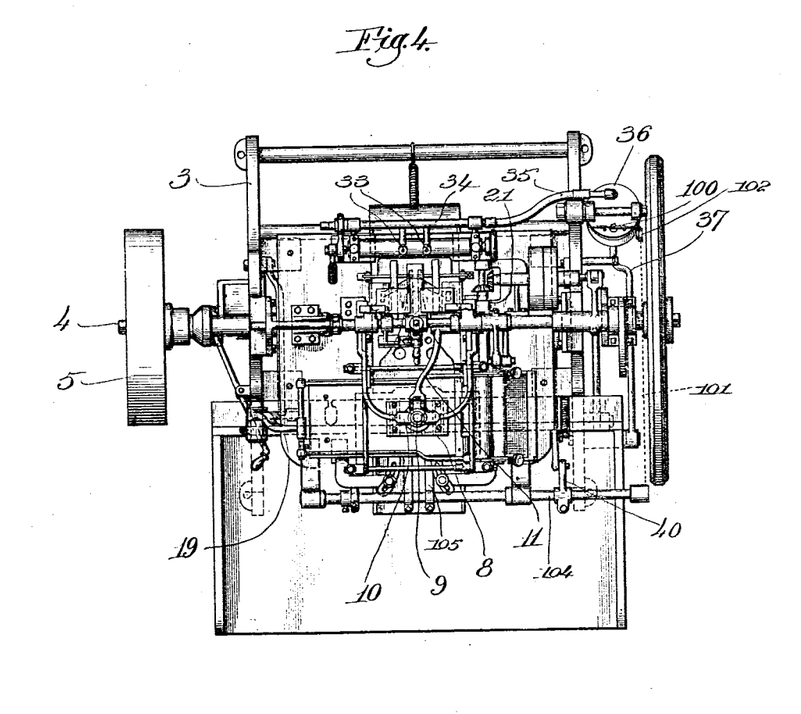
Fig. 4 is a top plan view.
Figure 5:
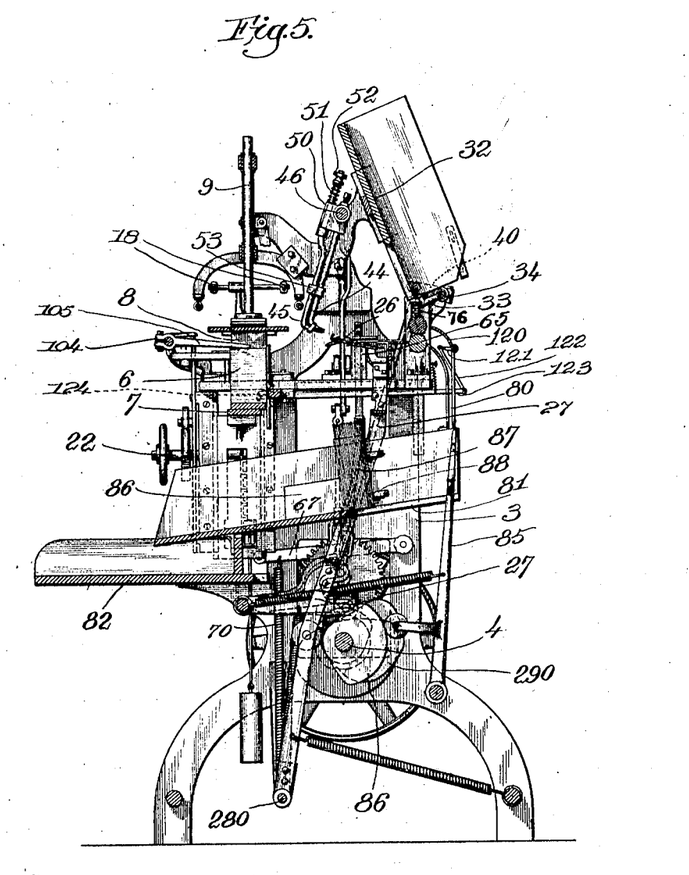
Fig. 5 is a vertical central section.
Figure 7:
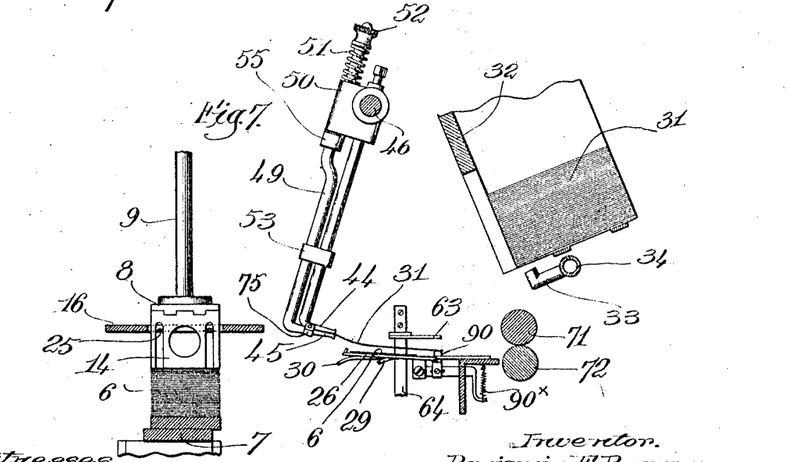
Fig. 7 shows the position of the parts when the envelop has been brought into juxtaposition to the gummed label.

The operation of the envelop-feeding mechanism is as follows: When the suction device has operated to separate the edge of the bottom envelop, as above described, the rock-shaft 46 is operated to swing the gripping-jaws into position shown in Fig. 6, and during this movement said jaws are separated by the cam 54, so that the edge of the separated envelop enters between the jaws. The cam 57 is so shaped and timed with reference to the cam 47 that just before the gripping-jaws begin their backward movement the cam 54 is withdrawn from between the head 50 and the collar 55, thereby permitting the jaws to close together under the influence of a spring 51, and thus to grip the envelop. The cam 47 then operates to swing the rock-shaft 46 and the gripping-jaws into the position shown in Figs. 5 and 7, this movement operating to carry the envelop directly over the gummed label, which has been brought into the position shown in Fig. 7 by means of the carrier above described. The stop-fingers 90 above described act also to hold the envelop off the gummed label, as shown in Fig. 5, and to prevent premature sticking together until the envelop has passed into position.

*Label-setting mechanism.*—When the envelop and gummed label are thus brought into juxtaposition, the envelop is pressed against the label by means of pressers with sufficient pressure to cause the envelop and label to adhere together. These pressers are designated by 63 and are shown as mounted on vertically-arranged slides 64 operating in suitable guides 65. The pressers are actuated by means of cams 66 fast on the shaft 4, said cams acting on levers 67 to which the slides are connected, by means of suitable links 131. The cams 66 are so shaped and timed that the pressers are in their elevated position, as shown in Fig. 6, when the envelop is being carried from the hopper to the position to receive the gummed label and therefore during this movement the envelop is passed beneath the pressers.

Figure 8:
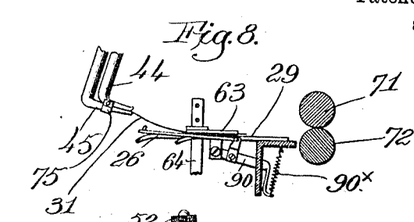
Fig. 8 is an enlarged detail of the pressers.

When the envelop and label are properly positioned with reference to each other, the cams 66 permit the pressers to descend under the influence of springs 70 toward the table 29, said springs bringing the pressers against the envelop and pressing the latter against the gummed label with sufficient force so that the label and envelop will adhere together, as shown in Fig. 8, the stop-fingers 90 yielding to permit the pressers to descend. After the label and envelop have thus been partially stuck together, they are passed between presser-rolls which operate to firmly seat the label. These presser-rolls are designated by 71 and 72, and may be operated in any suitable way. I have herein shown them as being driven from a pulley 73 on the shaft 4. The initial movement of the envelop with the label partially stuck thereto necessary to carry the envelop between the rolls, is effected by the gripping-jaws themselves. After the pressers have applied the label to the envelop the jaws begin their movement toward the holder to grasp a new envelop and during the initial part of this movement they push the envelop toward the presser rolls. The cam 57 for operating the sliding cam 54 is so timed that just as the jaws begin their movement toward the holder, they are separated sufficiently so that as the envelop is gripped by the presser-rolls it may be readily withdrawn from the gripping jaws. As the envelop is advancing through the presser-rolls, the jaws are moved from the position shown in Fig. 9 to that shown in Fig. 5, to grasp a fresh envelop, and during this movement said jaws are completely opened, as above described.

The fixed jaw is illustrated as provided with stops 75 which by their engagement with the edge of the envelop give the envelop its movement into the presser-rolls as the jaws begin their return movement, said stops acting to keep the envelop moving toward the presser-rolls after the jaws are opened. As each envelop passes through the presser-rolls the label becomes fully set thereon. The presser-roll 71 is movably mounted and is acted upon by suitable adjustable springs not shown. Any desired amount of pressure may thus be applied to the envelop.

As the envelop is discharged from between the presser-rolls, it passes into a guide 80 which conveys it to a receiver 81. This receiver extends through the machine and the open end thereof is at the front adjacent the table 82. As the envelops are received by the receiver, they may be moved forward toward the open front end thereof by any suitable means. I have herein shown for that purpose a vibrating arm 85 operated by means of a spring and a suitable cam 86. The upper end of the arm takes each envelop as it is fed into the receiver and carries it forward against the stack of envelops 87 which are supported in position against a sliding rest 86.

88 designates yielding stops which engage the last envelop and hold the stack of envelops in place, said stops yielding as each envelop is fed past them.

The operation of the entire machine will be readily understood from the foregoing, and may be briefly summarized as follows: The picker descends after having been gummed, thereby to gum the label and lift said label from the stack. During this time, the gripping-jaws swing from the position shown in Fig. 7 to that shown in Fig. 6, in which latter position, they grasp an envelop which has been previously separated by the suction mechanism, and at the same time, the picker ascends still farther, thus stripping the label therefrom. Just prior to the time that the label is thus stripped, the carrier 26 shoots underneath the label to catch it as it is stripped, as seen in Fig. 9. The carrier then moves forward to place the label into position to be applied to the envelop, and thereafter the gripping-jaws swing into the position shown in Fig. 7, thereby carrying an envelop beneath the pressers and in juxtaposition to the gummed labels. The pressers then descend, as shown in Fig. 8, and cause the label to adhere to the envelop. As the pressers rise, the jaws are moved slightly toward the hopper, then are opened sufficiently to release the envelop and then continue their movement toward the hopper, the envelop and label thus entering the presser-rolls. As the envelop with the label adhering thereto passes between the presser-rolls, the label is set, and then the labeled envelop is discharged into the receiver 81.

In addition to the above features, I have embodied in my invention means whereby the machine is rendered inoperative whenever the elevator mechanism 22 is lowered to such an extent that the picker does not strike and pick up a label supported thereby. During the operation of the machine, it is frequently necessary to supply added quantities of labels to the elevator 22, and this is done by lowering the latter to receive the labels. When this is done, the suction device is rendered inoperative so that no envelops will be seized by the envelop-feeding jaws. To accomplish this, I have provided the suction pump with an air-valve 100 which is opened when the elevator is lowered thereby to break the vacuum and prevent the operation of the suction device. As herein shown, the stem of the valve has secured thereto a flexible connection 101 leading around direction pulleys 102 and connected to an arm 103 on the shaft 104 which carries the usual feeler finger 105. This feeler finger is commonly employed in elevator mechanism of envelop machines. It rests on the pile of labels and by its downward movement as the labels are withdrawn, controls the upward feeding movement of the elevator. When the elevator is manually lowered to receive a new supply of labels, the shaft 104 rocks sufficiently to open the valve 100, and thereby break the vacuum.

I have also embodied in my machine mechanism whereby the envelops are prevented from being fed into the guide 80 when the table 7 has been elevated to a certain height. As herein shown, the upper end of the guide 80 has pivoted thereto a hood 120 which in its normal position directs the envelops into said guide, but which may be swung downwardly against the bottom roll 72 so that the envelops will pass over the hood and be deflected from the guide. This hood is mounted on a rock-shaft which has rigid therewith an arm 121 connected by a link 122 with a lever 123, the outer end 124 of which is in position to be engaged by the table 7 when it is elevated to a certain height. The swinging of the lever 123 throws the hood down against the roll 72 and thus the envelops are deflected from the guide. Other ways of rendering the machine inoperative when the labels need replenishing may be adopted without departing from the invention.

Figure 10:
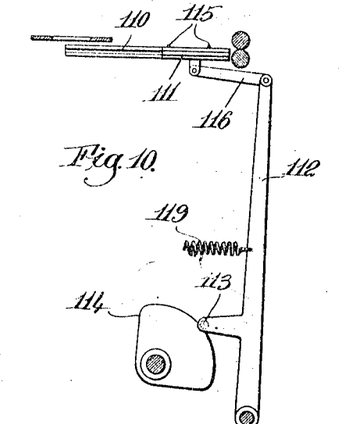
Fig. 10 shows a different form of carrier.
Figures 11, 12:
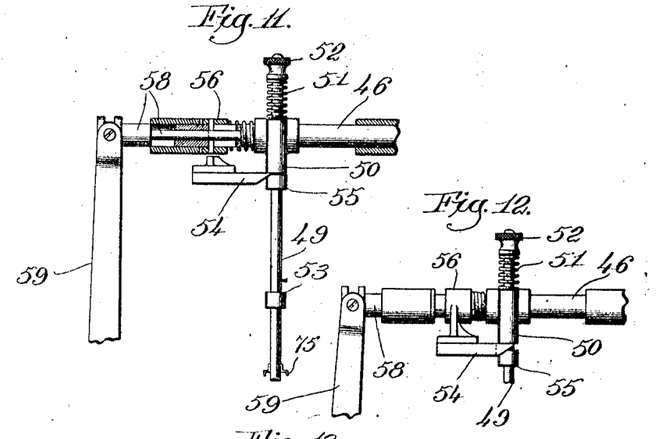
Figs. 11 and 12 are details of the means for opening the gripping jaws.
Figure 13:
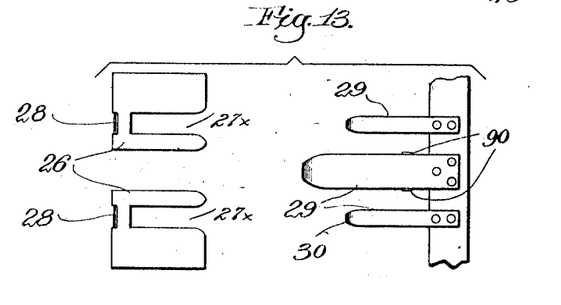
Fig. 13 is a plan view of the table 29 and carrier 26.
Figure 14:
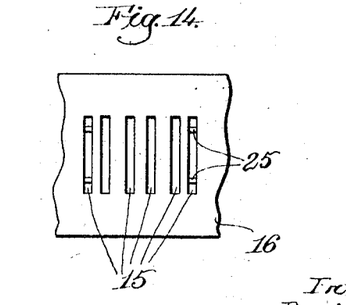
Fig. 14 is a plan of a portion of the stripper plate.

In Fig. 10 I have illustrated a different form of the invention in which the carrier is mounted to slide in ways rather than to swing in the arc of a circle. In this embodiment of my invention, the frame of the machine is provided with ways or guides 110 in which the carrier 111 slidably moves, said carrier being operated by means of a lever 112 carrying a roll 113 adapted to engage the periphery of a cam 114. The cam 114 and the spring 119 gives the carrier the proper movement to throw it forward underneath the picker when the latter is elevated and just prior to the time that the label is stripped therefrom, so that when the label is stripped it will be received by the carrier, and then to move the carrier backwardly with the gummed label thereon. When in this latter position, the envelop is fed into juxtaposition to the gummed label, and then the pressers 63 operate to press the envelop against the label. In this embodiment of the invention it is not necessary to employ a table separate from the carrier, for since the carrier has a right-line movement it may act as the table on which the labels are supported when the pressers are actuated. The carrier 111 is preferably provided with yieldingly-mounted positioning pins 115 by which the label is properly positioned. When the pressers descend, the pins yield to permit the envelop to be forced against the label. The lever 112 is secured to the carrier by means of a link 116 and preferably this link is adjustably connected to the carrier.

The drawings illustrate one embodiment of my invention only, and it will be obvious that various changes in the construction of the parts may be made without departing from the spirit of the invention.

Having fully described my invention, what I claim as new and desire to secure by Letters Patent is:—

1. In a labeling machine, means to sustain a pile of separate labels placed one on the other, means to apply gum to the top label of the pile, means to carry the gummed label into position to be applied to an envelop, a pair of gripping jaws to separate an envelop from a stack of envelops and feed said envelop into a position to have said label applied thereto and means to set the label.

2. In a labeling machine, means to sustain a pile of labels, means to apply gum to the top label of the pile, means to carry the gummed label into position to be applied to an envelop, a pair of gripping jaws to separate one envelop from a stack of envelops and feed said envelop into juxtaposition to the gummed label, and means to set the label.

3. In a labeling machine, means to sustain a pile of labels, means to apply gum to the top label of the pile, means to carry the gummed label into position to be applied to an envelop, a pair of gripping jaws to separate one envelop from a stack of envelops and feed said envelop into juxtaposition to the gummed label, and pressers to press said envelop against the label.

4. In a labeling machine, means to sustain a pile of labels, means to apply gum to the top label and remove said label from the pile, a reciprocating carrier to receive the gummed label from said means and carry it into position to be applied to an envelop, presser rolls, and means to feed an envelop into contact with the gummed label whereby the latter will adhere to the envelop and then to feed the envelop and label unitedly toward and between said presser rolls.

5. In a labeling machine, means to sustain a pile of labels, means to apply gum to the top label of the pile and remove said label from the pile, a stripper to strip the gummed label from said means, a reciprocating carrier to receive the gummed label and carry it into position to be applied to an envelop, means to feed an envelop into contact with the gummed label whereby the latter will adhere to the envelop, and presser rolls between which the envelop and attached label pass.

6. In a labeling machine, a rest or support, means to apply gum to a label and deposit it on said rest or support with the gummed face exposed, means to carry an envelop into contact with the gummed face of the label whereby said label will adhere to the envelop, and presser rolls, said latter means operating to feed the envelop and attached label to the presser rolls.

7. In a labeling machine, a movable carrier, means to apply gum to a label and deposit said label on the carrier with its gummed face uppermost, means to move the carrier to bring the label into position to be applied to an envelop, means to feed an envelop into contact with the upper exposed face of the label whereby the label will adhere to the under side of the envelop, and means to press the envelop and label together.

8. In a labeling machine, means to gum the top label of a pile of labels and separate the gummed label from said pile, means to carry the gummed label into position to be applied to an envelop, a pair of movable gripping-jaws to feed an envelop into juxtaposition to the gummed label, and means to open and close said jaws.

9. In a labeling machine, label-gumming mechanism, means to carry the gummed label into position to be applied to an envelop, a pair of swinging gripping-jaws to feed an envelop into juxtaposition to the gummed label, and means to open and close said jaws, combined with means to set the label.

10. In a labeling machine, label-gumming mechanism, means to carry the gummed label into position to be applied to an envelop, a pair of movable gripping-jaws to carry an envelop into juxtaposition to the gummed label, means to press the envelop against the gummed label, and means to open the gripping jaws to receive an envelop, to close them together to grip the envelop, and after the label is applied to the envelop to partially open the jaws to release the envelop.

11. In a labeling machine, label-gumming mechanism, means to carry the gummed label into position to be applied to an envelop, a pair of vibrating gripping-jaws, and label-setting mechanism, movement of the jaws in one direction carrying an envelop into juxtaposition to the gummed label, and the initial movement in the other direction, feeding the envelop with the applied label into the label-setting mechanism.

12. In a labeling machine, label-gumming mechanism, a pair of movable gripping-jaws to carry an envelop into juxtaposition to a gummed label, means to press the envelop against the gummed label, and means to partially open said jaws to release the envelop after the label has been applied and to subsequently completely open said jaws to receive an unlabeled envelop.

13. In a labeling machine, label-gumming mechanism, a pair of movable automatically-closing jaws to carry an envelop into juxtaposition to a gummed label, means to press the envelop against the gummed label, and means to partially open said jaws to release the envelop after the label has been applied thereto and subsequently to completely open said jaws to receive an unlabeled envelop.

14. In a labeling machine, label-gumming mechanism, vibrating gripping-jaws, and label-setting mechanism, movement of the jaws in one direction carrying an envelop into juxtaposition to a gummed label, and initial movement of said jaws in the other direction feeding the envelop with the label attached into the label-setting mechanism.

15. In a labeling machine, means to sustain a pile of labels, means to apply gum to the top label of the pile, a pair of vibrating gripping jaws to carry an envelop into juxtaposition to a gummed label, automatically-operative means to close said jaws, pressers to press the envelop against the label, and presser-rolls to set the label on the envelop.

16. In a labeling machine, a label-gumming mechanism, a pair of vibrating automatically-closing gripping jaws to carry an envelop into juxtaposition to a gummed label, pressers to press the envelop against the label, presser-rolls to set the label on the envelop, and means to partially open said jaws to release the envelop as it is taken by the presser-rolls and thereafter to completely open said jaws to receive an unlabeled envelop.

17. In a labeling machine, a picker to gum each label and pick it from a pile of labels, means to feed an envelop into juxtaposition to a gummed label, label-setting mechanism, and means to render the machine inoperative when the label-gumming mechanism does not operate.

18. In a labeling machine, label-gumming mechanism comprising elevator mechanism to sustain the labels to be gummed, a picker to gum each label and pick said label from the stack, envelop-feeding mechanism to feed envelops into juxtaposition to the gummed label, and means to render the envelop-feeding mechanism inoperative when the elevator mechanism is lowered.

19. In a labeling machine, means to sustain a pile of labels, means to apply gum to the top label of the pile, means to carry the gummed label into position to be applied to an envelop, means to separate an envelop from a stack of envelops, and other means to feed said separated envelop into position to have the label applied thereto.

20. In a labeling machine, means to sustain a pile of labels, means to apply gum to the top label of the pile, means to carry the gummed label into position to be applied to an envelop, means to separate an envelop from a stack of envelops, other means to feed said separated envelop into juxtaposition to said gummed label, and means to set the label.

21. In a labeling machine, means to sustain a pile of labels, means to apply gum to the top label of the pile, means to carry the gummed label into position to be applied to an envelop, means to separate an envelop from a stack of envelops, means to feed said separated envelop into juxtaposition to the gummed label, pressers to press said envelop against the label, and presser rolls between which said envelop and the attached label pass.

22. In a labeling machine, means to sustain a pile of labels, means to apply gum to the top label of the pile, means to carry the gummed label into position to be applied to an envelop, automatic means to separate an envelop from a stack of envelops, and other means to feed the separated envelop into position to have a label applied thereto.

23. In a labeling machine, label-gumming mechanism, means to carry the gummed label into position to be applied to an envelop, automatic means to separate an envelop from a stack of envelops, and gripping jaws to feed the separated envelop into position to have the label applied thereto.

24. In a labeling machine, means operating first to gum the top label of a pile of labels and then to separate said label from the pile, a rest to sustain the gummed label with its gummed face uppermost, mechanism operating in timed relation to said means to deposit an envelop onto the gummed face of the label whereby the label will adhere to the under side of the envelop, and a combined envelop-feeding and label-setting mechanism.

25. In a labeling machine, means operating first to gum the top label of a pile of labels and then to separate said label from the pile, a rest to sustain the gummed label with its gummed face uppermost, means to deposit an envelop onto the gummed face of the label whereby the label will adhere to the under side of the envelop, and label-setting mechanism, said latter means operating to feed the envelop with the label attached to the label-setting mechanism.

In testimony whereof, I have signed my name to this specification, in the presence of two subscribing witnesses.

BENJAMIN F. BROWN.

Witnesses:
 NATHAN HEARD,
 LOUIS C. SMITH.